Patented June 10, 1947

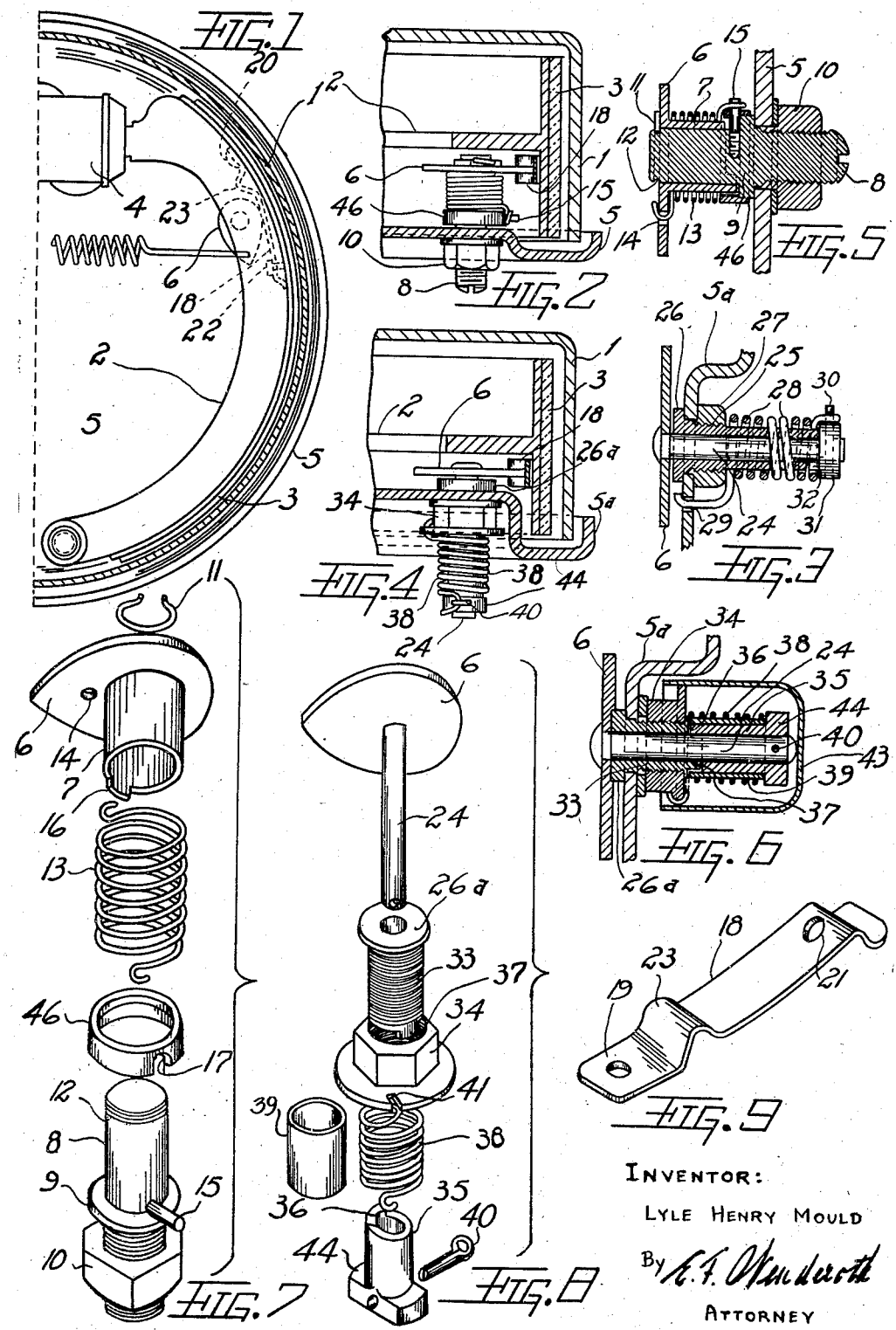

2,421,802

UNITED STATES PATENT OFFICE 2,421,802

SELF-ADJUSTING STOP MEANS FOR THE SHOES OF INTERNAL-EXPANDING BRAKES

Lyle Henry Mould, Lady Grey, Cape of Good Hope, Union of South Africa

Application March 19, 1945, Serial No. 583,468
In the Union of South Africa April 14, 1944

8 Claims. (Cl. 188—79.5)

1

This invention relates to self-adjusting stop means for the shoes of internal-expanding brakes, and is more particularly applicable to motor vehicle brakes of the kind in which a pair of arcuate brake shoes are expanded against a brake drum by hydraulic or mechanical means operating between their two adjacent ends.

The usual stop means employed to limit the retracted position of the shoes, consists of stop bolts having cam-shaped heads, which cam bolts are provided at least one for each shoe, and are so arranged that each bolt passes through the back plate of the brake assembly in such a position that the said cam-shaped head thereof bears edgewise against the inside of the shoe when the shoe is retracted to its "off" position. Adjustment of this known device is effected by loosening said bolt, rotating it the required amount, and thereafter tightening it again. This manual adjustment has to be effected periodically as the brake linings wear. An object of the present invention is to provide stop means which are self-adjusting, in that the retracted position of a brake shoe is advanced automatically as the linings wear, so that the required clearance between the brake shoes and the brake drum remains substantially constant, irrespective of wear of the shoe linings.

The foregoing and other objects of the invention are realized by the provision of a device which consists of: a cam part which is rotatably associated with a locating part adapted to project through and be fixed to the back plate of the brake assembly, so that said cam part is in a position to co-act cam fashion with the back or inside face of a brake shoe; spring means tending to cause rotation of the cam part with respect to the locating part in a direction tending to force the brake shoe towards the brake drum; and spring-urged frictional retarding means interposed between the edge of the cam part and the brake shoe, the arrangement being such that the spring-urged frictional retarding means and the spring means tending to cause rotation of the cam part, are so adjusted that the normal brake clearance is maintained and slipping between the cam part and said frictional retarding means to advance the retracted position of the shoe, takes place only as and when wear occurs in the brake shoe lining.

It is to be understood that the two spring means referred to are so adjusted that, with the normal application of the brakes, and the correct clearance, the distance of travel of a shoe from its "off" or retracted position to its "on"

2 position, is insufficient to reduce the resilient pressure of the frictional retarding means against the cam part, to permit of rotational movement of said cam part. As wear of the brake shoe lining takes place, however, this distance of travel increases until it is sufficient to permit slipping of the cam part with respect to the frictional retarding means, to take place, and thereby to advance the retracted position of the shoe and reduce the clearance so as to bring it back to the normal amount. Means are provided for adjusting the spring pressure of the spring means tending to cause rotation of the cam part.

The frictional retarding means is attached to the inner side face of a brake shoe, and, in one form, is a flat leaf spring.

In order that the invention may be more clearly understood and carried into practice, reference is now made to the accompanying drawings in which like reference numerals refer to like parts throughout the several views.

In the drawings:

Fig. 1 is a sectional side elevation of one half of a brake assembly to which the invention is shown applied;

Fig. 2 is a fragmentary sectional plan view taken through the brake assembly shown in Fig. 1, and illustrating a preferred form of the invention.

Fig. 3 is a sectional view of an alternative form of device constructed according to the invention and adapted for use in cases where insufficient space exists inside the back-plate to accommodate all the operative parts of the device;

Fig. 4 is a view similar to Fig. 2 showing another modification of the invention similar to that shown in Fig. 3;

Fig. 5 is a sectional view of the device shown in Fig. 2;

Fig. 6 is a sectional view of the device shown in Fig. 4, but with the addition of a dust cap;

Fig. 7 is a perspective exploded view of the device of Figs. 2 and 5, shown to a larger scale;

Fig. 8 is a similar view of the device of Figs. 4 and 6 but excluding the dust cap and Fig. 9 is a perspective view of the frictional retarding leaf spring.

Referring to the drawings generally, reference numeral 1 denotes a brake drum while reference numeral 2 shows an arcuate brake shoe provided with a brake lining 3, arranged to co-act therewith in known manner, such as by means of the hydraulic cylinder 4 secured to the usual back plate 5.

Referring to Figs. 2, 5 and 7, the device consists of a cam part 6 provided with an integrally formed sleeve-like boss 7, by means of which it is rotatably mounted on the inner end of the locating part in the form of a pin 8 provided with an intermediate collar portion 9 and having its outer end screw-threaded to receive the securing nut 10 by means of which the device as a whole is fixed to the back plate 5. The cam part is secured on the pin 8 by the spring clip 11 which engages in a groove 12 provided on the inner end of said pin 8. Threaded over the sleeve-like boss 7 is the coiled spring 13, which has one end anchored to the cam part 6 by being bent to hook form and inserted through a hole 14 therein. The opposite end, likewise bent to hook form, is anchored by engaging with the anchor peg 15, inserted in the pin 8 on the inner side of the collar 9 thereof. The projection 16 on the end of the boss 7 co-acts with the anchor peg 15 for purposes of retaining a minimum torsional loading of the spring 13. A loose guard ring 46 which is arranged to fit over collar 9, is a sliding fit on the boss 7, and is provided for the purpose of preventing the end coils of the spring 13 from entering the space between the end of the boss 7 and the collar 9 and thereby tending to interfere with the proper functioning of the device. The ring 46 is slotted at 17 to provide clearance for the anchor peg 15. As shown in Figs. 1 and 2, the edge of the cam part 6 is arranged to be in constant contact with the frictional retarding leaf spring 18 which is immovably secured by its end 19 (see Fig. 9) to the inside face of the brake shoe 2 by the rivet or screw 20. The opposite end, provided with hole 21, is located by the stop screw or rivet 22 in such a manner as to permit free flexing movement within limits. The leaf spring 18 is bent outwardly as shown at 23 to provide stop means limiting the rotational movement of the cam part 6 after it has reached its maximum adjusted position.

The device operates as follows:

The brake shoes 2 are normally held in the "off" position against the rotatable cam parts 6, Fig. 1, by the brake shoe return springs in which position the leaf springs 18 are compressed between the cam part 6 and brake shoes 2.

When the brake is applied, the free ends of the brake shoes, adjacent to the brake cylinder 4 are forced outwardly and away from the cam parts 6 toward the brake drums. The tension of a leaf spring 18 allows its free or movable end portion to keep in contact with its cam part 6 thereby preventing the cam from rotating.

When the brake is released, the shoes return to the "off" position, compressing the springs 18 between them and the cam parts. The movement of the spring 18 is limited by the shouldered stop rivet 22. As the brake linings wear, the brake shoes 2 must move farther away from the cam part 6 when the brakes are applied, until rivet 22 acts as a stop for the movable end of the spring 18 and carries it with the shoes away from its cam part 6. Its pressure against the cam part 6 is, therefore, released which allows the cam part to be rotated by the spring 13 (Fig. 7), bringing a wider portion of the cam part into contact with the spring 18.

When the brakes are now released, the shoes again compress springs 18 as they return to the new "off" position, which will be in advance of the previous "off" position by the extra width introduced by the cam during its rotation, for example if the extra width of cam introduced between its spindle 8 (Fig. 7) and the brake shoes, is ⅛ inch then the shoes will be ⅛ inch nearer the brake drums when they are in the "off" position, than they were before the cam rotated.

The movement of the brake shoes is limited by and corresponds to the free movement of the spring 18, its free movement being limited by the stop rivet 22 (Fig. 1) to the preset minimum necessary for free operation of the drums when the brake is off.

If for example, the normal movement of the brake shoes, from the "off" to the full "on" position is ⅛ inch and the brake linings wear $\tfrac{1}{16}$ inch the rotatable cam will, when the brake is fully applied, revolve enough to remain in contact with the spring 18 as the spring is carried away with the shoes and thereby introduce a portion of the cam that is $\tfrac{1}{16}$ inch wider than that which was in contact with the spring before the brake was applied.

Fig. 3 shows an alternative form which the device may take for use in brake assemblies in which there is insufficient space on the inside of the back plate 5a to accommodate all the operative parts of the device. In this case the cam part 6, which is the only moving part located on the inside of the back plate 5a, is provided with a spindle 24 which is rotatably assembled in the bore of the locating part 25 which is in the form of a sleeve having a flange 26 at one end and with that portion of the sleeve 25 adjacent the flange 26, screw-threaded to receive the securing nut 27. The coiled spring 28 (corresponding to the spring 13) is in this case threaded onto the outer end portion of the sleeve 25 and has one end anchored to the back plate 5a by being bent so as to project through a hole 29 therein; while the opposite end is anchored to the protruding end of the spindle 24 by means of an anchor pin 30 and collar 31. The anchor pin 30 passes through the collar 31 and the protruding end of the spindle 24, and thereby keys said collar thereto. A projection 32 on the collar 31 co-acts with a corresponding projection on the outer end of the sleeve 25 to provide stop means for torsionally loading the spring 28. The projection to the end of the sleeve 25, (not shown) is similar to the projection 16 on the sleeve 7.

Figs. 4, 6 and 8 show a preferred modification of the alternative form of the device shown in Fig. 3. In this case a sleeve 33, corresponding to the sleeve 25 of Fig. 3, but made shorter, is screw-threaded for the whole of its length beyond the collar 26a, with which screw-threaded portion a flanged securing nut 34 co-acts for fixing the sleeve 33 to the back plate 5a. In addition a collar part 44 corresponding to the collar 31 of Fig. 3, is provided with a sleeve-like extension 35, having a projection 36 on its end adapted to co-act with a projection 37 on the end of the sleeve 33 to provide stop means for torsionally loading the spring 38, (corresponding to the spring 28 of Fig. 3), which is threaded onto the said sleeve-like extension 35 over the guard sleeve 39 which is provided to prevent the end coils of the spring 38 from slipping into the space between the ends of the sleeve parts 33 and 35 and thereby tending to interfere with the proper operation of the device. The collar part 44 is keyed to the spindle 24 by the split pin 40 which also provides anchoring means for the outer hooked end of the spring 38, the opposite hooked end being anchored to the flange of the nut 34 by engaging in a slot 41 therein.

To protect the moving parts against dust and wind, a dust cap 43 is arranged to be screwed onto the flange of the nut 34 as shown in Fig. 6.

What I claim is:

1. Self-adjusting stop means for a shoe of an internal-expanding brake assembly of the character described and including a brake drum and a back plate, said stop means comprising a locating part projecting through and fixed to the said back plate, a cam part rotatably associated with said locating part, the parts being so positioned relative to the brake shoe that said cam part coacts in cam fashion with an adjacent portion of the brake shoe, spring means tending to cause rotation of the cam part with respect to the locating part in a direction tending to force the brake shoe towards the brake drum, and spring-urged frictional retarding means interposed between the edge of the cam part and the brake shoe, the spring-urged frictional retarding means and the spring means tending to cause rotation of the cam part, being so adjusted that the normal brake clearance is maintained and slipping between the cam part and said frictional retarding means to advance the retracted position of the shoe, takes place only as and when wear occurs in the brake shoe lining, and means for adjusting the spring pressure of the spring means tending to cause rotation of the cam part.

2. Self-adjusting stop means for a shoe of an internal-expanding brake assembly of the character described and including a brake drum and a back plate, said stop means comprising a locating part projecting through and fixed to the said back plate, a cam part rotatably associated with said locating part, the parts being so positioned relative to the brake shoe that said cam part coacts in cam fashion with an adjacent portion of the brake shoe, spring means tending to cause rotation of the cam part with respect to the locating part in a direction tending to force the brake shoe towards the brake drum, and spring-urged frictional retarding means interposed between the edge of the cam part and the brake shoe, the spring-urged frictional retarding means and the spring means tending to cause rotation of the cam part, being so adjusted that the normal brake clearance is maintained and slipping between the cam part and said frictional retarding means to advance the retracted position of the shoe, takes place only as and when wear occurs in the brake shoe lining, and means for adjusting the spring pressure of the spring means tending to cause rotation of the cam part, the said frictional retarding means being a flat leaf spring fixed to the inside face of the brake shoe by its ends, the intermediate portion of said spring being spaced from said face to provide clearance for flexing movement, means fixedly securing one end of said spring, so that while its outward flexing movement away from the shoe is limited, it is free to move inwardly, as when it makes contact with the cam part on retraction of the brake shoe.

3. Self-adjusting stop means as defined in claim 1, said cam part being provided with a boss of sleeve form and said locating part being in the form of a collared locating-pin having its outer end screw-threaded and having said boss of sleeve form rotatably mounted on its inner end, a nut on said screw-threaded end whereby the locating-pin may be attached to said back plate, and the spring means tending to cause rotation of the cam part, consisting of a coiled spring threaded onto the said boss thereof and having one end anchored thereto, and means anchoring the opposite end of said coil spring to the aforementioned collared pin.

4. Self-adjusting stop means as defined in claim 1, said cam part being provided with a boss of sleeve form and said locating part being in the form of a collared locating-pin having its outer end screw-threaded and having said boss of sleeve form rotatably mounted on its inner end, a nut on said screw-threaded end whereby the locating-pin may be attached to said back plate, and the spring means tending to cause rotation of the cam part, consisting of a coiled spring threaded onto the said boss thereof and having one end anchored thereto, and an anchor peg on said collared pin for anchoring the opposite end of said coil spring.

5. Self-adjusting stop means as defined in claim 1, said cam part being provided with a boss of sleeve form and said locating part being in the form of a collared locating-pin having its outer end screw-threaded and having said boss of sleeve form rotatably mounted on its inner end, a nut on said screw-threaded end whereby the locating-pin may be attached to said back plate, and the spring means tending to cause rotation of the cam part, consisting of a coiled spring threaded onto the said boss thereof and having one end anchored thereto, an anchor peg on said collared pin for anchoring the opposite end of said coil spring, and a projection on the end of said boss co-acting with said anchor peg to act as stop means for the purpose of retaining a minimum torsional loading of the coil spring.

6. Self-adjusting stop means as defined in claim 1, said cam part being provided with a spindle and said locating part being in the form of a sleeve having one end flanged, a portion of the sleeve adjacent said flanged end being screw-threaded, said spindle being rotatably assembled in the bore of said sleeve with one end of the spindle protruding therefrom, a nut on said screw-threaded end whereby the locating part may be secured to said back plate, or coiled spring threaded over the outer end of said sleeve and having one end thereof anchored to the back plate and the opposite end to the protruding end of the spindle of the cam part.

7. Self-adjusting stop means as defined in claim 1, said cam part being provided with a spindle and said locating part being in the form of a sleeve having one end flanged, a portion of the sleeve adjacent said flanged end being screw-threaded, said spindle being rotatably assembled in the bore of said sleeve with one end of the spindle protruding therefrom, a nut on said screw-threaded end whereby the locating part may be secured to said back plate, or coiled spring threaded over the outer end of said sleeve and having one end thereof anchored to the back plate and the opposite end to the protruding end of the spindle of the cam part by means of a collar and anchor pin, said pin keying said collar to said cam spindle, said collar being provided with a projection, the outer end of said locating sleeve being provided with a corresponding projection, and said projections co-acting to provide stop means for torsionally loading said coiled spring.

8. Self-adjusting stop means as defined in claim 1, said cam part being provided with a spindle and said locating part being in the form of a sleeve having one end flanged, said sleeve being screw-threaded over the entire length thereof, said spindle being rotatably assembled in the bore of the sleeve with one end of the spindle protruding therefrom, a flanged securing nut on said screw-threaded sleeve whereby the latter may be secured to said back plate, a collar member having a sleeve arranged on the protruding part of said spindle, said sleeve having a projection on its inner end, said locating sleeve also having a projection on its inner end and arranged to co-act with said first-named projection, a coiled spring threaded over the sleeve of said collar member, one end of said coiled spring being anchored to the flange of said securing nut, and means keying said collar member to the end of said spindle, the other end of said coiled spring being anchored to said keying means.

LYLE HENRY MOULD.

REFERENCES CITED

The following references are of record in the file of this patent:

UNITED STATES PATENTS

| Number | Name | Date |
| --- | --- | --- |
| 2,350,878 | Cowell | June 6, 1944 |